[19] United States Patent
Milner et al.

[11] 4,228,070
[45] Oct. 14, 1980

[54] PURIFICATION OF PHOTOGRAPHIC IMAGE-FORMING SULFONAMIDO COMPOUNDS EMPLOYING IMMISCIBLE SOLVENTS

[75] Inventors: Nigel E. Milner, Leighton Buzzard; Christine C. Payne, London, both of England

[73] Assignee: Eastman Kodak Company, Rochester, N.Y.

[21] Appl. No.: 15,972

[22] Filed: Feb. 28, 1979

[51] Int. Cl.$^2$ .............................................. C09B 46/00
[52] U.S. Cl. .................................... 260/152; 260/198; 260/199; 260/202; 260/207; 260/208
[58] Field of Search ......... 260/556 AR, 556 B, 556 S, 260/556 C, 208, 152, 202, 207, 198, 199

[56] References Cited

U.S. PATENT DOCUMENTS

| | | | |
|---|---|---|---|
| 2,564,225 | 8/1951 | Mayers | 260/205 |
| 2,983,608 | 5/1961 | Beavers | 260/163 X |
| 3,236,643 | 2/1966 | Haseu | 96/29 |
| 3,575,957 | 4/1971 | Demler et al. | 260/163 |
| 3,932,380 | 1/1976 | Urutak et al. | 260/197 |
| 4,013,633 | 3/1977 | Haase et al. | 260/162 |
| 4,142,891 | 3/1979 | Baigrie et al. | 96/29 D |

FOREIGN PATENT DOCUMENTS 917648 12/1972 Canada ....................................... 96/101
1142797 2/1969 United Kingdom .......................... 96/3

Primary Examiner—Floyd D. Higel
Attorney, Agent, or Firm—Arthur H. Rosenstein

[57] ABSTRACT

A process for purifying a photographic image-forming sulfonamido compound comprises the steps of:
  a. preparing a first solution by dissolving an unpurified image-forming sulfonamido compound in an aprotic solvent;
  b. removing impurities from said first solution by, at least once:
    i. mixing said first solution with an immiscible nonpolar, low-boiling organic solvent to form a mixture of said first solution and a second solution comprising said immiscible nonpolar, low-boiling organic solvent and at least a portion of said impurities; and
    ii. separating said first solution from said second solution; and
  c. recovering purified image-forming sulfonamido compound from said first solution.

The process is useful in the purification of a nondiffusible sulfonamido compound which is alkali-cleavable upon oxidation to release a diffusible sulfonamido color-providing moiety.

18 Claims, No Drawings

PURIFICATION OF PHOTOGRAPHIC IMAGE-FORMING SULFONAMIDO COMPOUNDS EMPLOYING IMMISCIBLE SOLVENTS

BACKGROUND OF THE INVENTION

1. Field of the Invention

This invention relates to purification processes for photographic image-forming materials and more particularly to purification processes wherein said image-forming materials are nondiffusible sulfonamido compounds which are alkali-cleavable upon oxidation to release diffusible sulfonamido color-providing moieties.

2. Description Relative to the Prior Art

It is well known in the art to use image dye-providing sulfonamido materials in a photographic element wherein an imagewise exposed element can be contacted with an alkaline processing solution to effect an imagewise difference in mobility of at least a portion of the dye-providing sulfonamido material, i.e. to effect release of a dye or dye precursor, to render the compound insoluble or soluble. One such use of image dye-providing sulfonamido materials in color transfer processes is described by Fleckenstein in U.S. Pat. No. 4,076,529, issued Feb. 28, 1978 and Belgian Pat. No. 799,268, issued Feb. 28, 1973.

A method for preparing an image-forming sulfonamido compound is described in Example 42 of the above-noted U.S. Pat. No. 4,076,529 and comprises adding N-[5-hydroxy-8-(3-fluorosulfonylphenylazo)-1-naphthyl]methanesulfonamide to a solution of sodium bicarbonate and 1-amino-3-[2,4-bis(t-pentyl)phenoxybutylcarbamoyl]-4-hydroxynaphthalene in dimethylsulfoxide, under nitrogen.

The compound (designated magenta dye releasing compound XLIV) obtained in this Example has the formula:

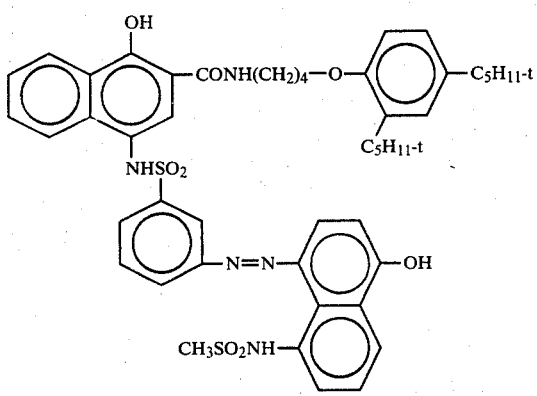

and is useful in photographic color diffusion transfer processes as a redox dye releaser. As described in U.S. Pat. No. 4,076,529, a redox dye releaser is characterized by its capacity to release a dye on reaction with oxidized deveoping agent in the presence of alkali. It is of course desirable that the redox dye releaser be as pure as possible. In fact, however, a redox dye releaser prepared by the reaction of a sulfonyl fluoride with an amino naphthol represented as follows:

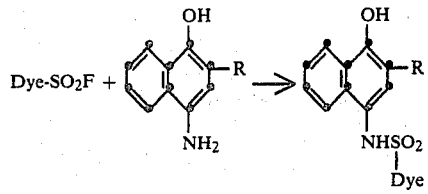

usually contains impurities which may be starting materials or derived compounds such as the oxidation products of 4-amino-1-naphthols.

It has been found that recrystallization alone does not always remove these impurities to the extent consistent with maximum photographic performance. For small samples, the various types of chromatography provide a ready solution to this problem but these techniques are not easily applied to large scale production.

In U.S. Pat. No. 3,236,643, issued Feb. 22, 1966, Husek noted the solubility of the claimed dye developers in dimethylformamide. However, these dye developers are isolated by precipitation in aqueous hydrochloric acid with no purification. Only the reaction intermediates are purified, and this procedure is accomplished by dissolving the intermediates in methyl Cellosolve and reprecipitating in water.

Canadian Pat. No. 917,648, issued Dec. 26, 1972 by Idelson, discloses the preparation of metal-dye complexes in a 1:10 mixture of dimethylformamide and methylene chloride. The product is isolated by pouring the reaction mixture into water and evaporating the methylene chloride. Purification is effected by reprecipitation of an acetone solution of the metal-dye complex in water.

In British Pat. No. 1,142,797, issued Aug. 19, 1965, Shipley describes a purification process for anthraquinone dye developers in a mixture comprising:

(1) dissolving an unpurified dye developer in a mixture comprising a water-soluble ketone and a small amount of strong mineral acid;
(2) filtering the resulting solution to remove impurities which are acetone-insoluble; and
(3) adding water to the filtered solution to precipitate the anthraquinone dye developer.

However, this process is suitable only for removing impurities from anthraquinone dye developers which are acetone-insoluble. Acetone soluble dye releasers cannot be purified in this manner.

It is thus seen that a purification process suitable for large-scale manufacture of photographic image-forming sulfonamido compounds is extremely desirable. It is further seen that such a process should also remove acetone-soluble impurities.

SUMMARY OF THE INVENTION

It has now been found that the solubility in petroleum, or other immiscible non-polar, low boiling organic solvent, of the impurities found in unpurified image-forming sulfonamido compounds is usually greater than that of the sulfonamido compounds themselves. These impurities can be removed by:

a. preparing a first solution by dissolving an unpurified image-forming sulfonamido compound in an aprotic solvent;

b. removing impurities from said first solution by, at least once:

i. mixing said first solution with an immiscible nonpolar, low-boiling organic solvent to form a mixture of said first solution and a second solution comprising said immisible nonpolar, low-boiling organic solvent and at least a portion of said impurities; and c. recovering purified image-forming sulfonamido compound from said first solution.

In Step (b) above, the image-forming sulfonamido compound remains almost entirely in the aprotic solvent layer and impurities are removed in the immiscible nonpolar, low-boiling organic solvent. The above-described process can be used in the large-scale manufacture of image-forming sulfonamido compounds, and can remove impurities which are soluble in acetone.

In a further embodiment, recovery of the purified sulfonamido compound in Step (c) can be effected by:

a. evaporating said first solution to remove nonpolar, low-boiling solvent contamination; and b. precipitating said image-forming sulfonamido compound in a nonsolvent.

In an alternative embodiment of the invention, recovery of the purified sulfonamido compound in Step (c) can be effected by:

a. preparing a third solution by adding a water-immiscible low-boiling solvent of intermediate polarity to said first solution;

b. removing said aprotic solvent from said third solution by at least once:

i. mixing said third solution with water to form a mixture of said third solution and a fourth solution comprising water and at least a portion of said aprotic solvent; and ii. separating said third solution from said fourth solution; and c. evaporating at least a portion of said water-immiscible low-boiling solvent of intermediate polarity from said third solution to effect crystallization of said purified image-forming sulfonamido compound.

In a still further embodiment of the invention, in a process for purifying a nondiffusible sulfonamido compound which is alkali-cleavable upon oxidation to release a diffusible sulfonamido color-providing moiety, said sulfonamido compound having the formula:

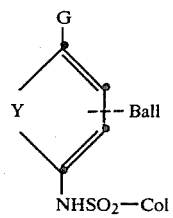

wherein:

Col is a dye or dye precursor moiety;

Ball is an organic ballasting group which renders said compound nondiffusible in a photographic element during development in an alkaline processing composition;

Y represents the atoms necessary to complete a benzene, naphthalene or heterocyclic nucleus; and G is OR or $NHR_1$ wherein R is hydrogen or a hydrolyzable moiety and $R_1$ is hydrogen or an alkyl group of 1 to 22 carbon atoms, the improvement comprises the steps of:

a. preparing a first solution by dissolving said nondiffusible sulfonamido compound in an aprotic solvent;

b. removing impurities from said first solution by, at least once:

i. mixing said first solution with an immiscible nonpolar, low-boiling organic solvent to form a mixture of said first solution and a second solution comprising said immiscible nonpolar, low-boiling organic solvent and at least a portion of said impurities; and ii. separating said first solution from said second solution; and c. recovering purified nondiffusible sulfonamido compound from said first solution.

DETAILED DESCRIPTION OF PREFERRED EMBODIMENTS

The novel process for purifying a photographic image-forming sulfonamido compound comprises the steps of:

a. preparing a first solution by dissolving an unpurified image-forming sulfonamido compound in an aprotic solvent;

b. removing impurities from said first solution by, at least once:

i. mixing said first solution with an immiscible nonpolar, low-boiling organic solvent to form a mixture of said first solution and a second solution comprising said immiscible nonpolar, low-boiling organic solvent and at least a portion of said impurities; and ii. separating said first solution from said second solution; and c. recovering purified image-forming sulfonamido compound from said first solution.

"Aprotic solvents" are polar solvents of moderately high dielectric constants which do not contain acidic hydrogen. A suitable aprotic solvent which can be used in the process of the invention is dimethyl formamide.

The concentration of the solution comprising unpurified image-forming sulfonamido compound in the aprotic solvent can be varied between 50 and 500 grams per liter of solvent, and preferably is from 100 to 200 grams per liter of solvent.

Immiscible nonpolar, low-boiling solvents are those solvents which generally have boiling ranges of from 40° C. to 105° C. and are immiscible with the aprotic solvent. Examples of immiscible nonpolar, low-boiling solvents which can be used in the process include petroleum hydrocarbons such as ligroin having a boiling range of 60°–80° C.; hexane; cyclopentane; 2-methylbutane; cyclohexene; cyclohexane; methylcyclopentane; ethylcyclobutane; heptane and the like. The preferred immiscible nonpolar, low-boiling solvent is ligroin having a boiling range of 60°–80° C. or 74°–96° C.

The ratio (by volume) of immiscible nonpolar, low-boiling solvent to aprotic solvent used in the process can vary from 1:2 to 3:1, and preferably ranges from 1:2 to 1:1, for each extraction.

Separation of the first solution, comprising aprotic solvent containing the image-forming sulfonamido compound, from the second solution, comprising immiscible nonpolar, low-boiling solvent containing at least a portion of the impurities, can be accomplished by allowing the mixture to stand until two immiscible layers of solution form. The time required for separation of the mixture into the two immiscible layers varies from 5 to 120 minutes. The immiscible layers so formed can be physically separated by drawing off the lower layer, by means of a release valve in the lower portion of the containing vessel, or by drawing off the upper layer, by floating or inserting a suction device into the upper layer. The desired layer comprising the aprotic solvent containing the image-forming sulfonamido compound can be retained for further extractions, if desired, or for recovery of purified image-forming sulfonamido compound. When the preferred solvents are employed, the bottom layer is the desired layer. The layer comprising a solution of the immiscible nonpolar, low-boiling solvent and at least a portion of the impurities can be discarded. When the preferred solvents are employed, the upper layer can be discarded.

The number of times the solution comprising aprotic solvent and unpurified image-forming sulfonamido compound is mixed with an immiscible nonpolar, low-boiling solvent, and subsequently separated from it to remove at least a portion of the impurities from the first solution, is determined by balancing the degree of purity required against costs incurred in large scale production. The number of extractions employed can vary from 1 to 5. Typically 2 to 5 repeated extractions are used to provide the required purity.

The temperature at which the process of the present invention can be carried out is subject to wide variation. Typically, the temperature is not critical between the limits of 10° and 30° C. Most often it is in the range of about 15° to about 25° C. The process pressure could be carried out at superatmospheric pressures but typically the process is carried out at atmospheric pressure. It is preferred that the pressure-temperature combination be such that the solubility relationships of the various solvents employed in the process are maintained to facilitate removal of impurities by extraction from the solution comprising aprotic solvent and the image-forming sulfonamido compound. Other factors affecting the temperature and pressure selected for the process of the invention include the freezing point and boiling point of the solvents and the immiscibility of the solvents. Generally, both solvents should be liquid at the temperature and pressure employed.

The nonpolar, low-boiling organic solvent should generally be immiscible with the aprotic solvent to ensure complete separation of the impurity from the dye releasing compound and the aprotic solvent should be immiscible with the said organic solvent to ensure that no dye releasing compound is lost in the purification. However, when the aprotic solvent contains the crude sulfonamido compound, the low-boiling point solvent and the aprotic solvent may become slightly miscible.

The method of recovery in Step (c) of the process described above can be one of several methods. Recovery method I comprises the steps of:
a. evaporating said first solution to remove nonpolar, low-boiling solvent contamination; and
b. precipitating said image-forming sulfonamido compound in a nonsolvent.

In recovery method I, the evaporation of said first solution, comprising aprotic solvent and the image-forming sulfonamido compound, to remove nonpolar, low-boiling solvent contamination can be performed over temperatures ranging from about 15° to about 50° C. and under pressures of about 15 to about 100 mm Hg. The combination of pressure and temperature, however, should be selected such that the nonpolar, low-boiling solvent is readily vaporized. Preferably the temperature ranges from about 30° to about 50° C., and the pressure is a reduced pressure of about 15 mm Hg.

Step (ii) of recovery method I is the precipitation of the image-forming sulfonamido compound in a nonsolvent for said sulfonamido compound. Examples of nonsolvents include water, aqueous dilute acid solution, alcoholic dilute acid solution and glacial acetic acid. The preferred nonsolvent is an alcoholic dilute acid solution.

Suitable alcohols include methanol, ethanol, propanol, isopropanol and the like. The preferred alcohols are methanol and isopropanol. Suitable acids include hydrochloric, acetic, sulphuric and the like acids. The preferred acids are hydrochloric acid and acetic acid. Highly preferred nonsolvents are a dilute solution of hydrochloric acid in methanol and a dilute solution of acetic acid in isopropanol.

When the nonsolvent comprises aqueous dilute mineral acid solution or alcoholic dilute mineral acid solution, the concentration of the acid can vary from about 5 to about 20 percent by weight. Typically the acid concentration is from about 10 to about 15 percent by weight. Using acetic acid, the concentration can be from 50% to 80% or even 100 percent by weight.

The ratio of the volume of nonsolvent to the volume of solution comprising aprotic solvent and image-forming sulfonamido compound can be from 3:1 to 10:1. Most often this ratio varies between 5:1 and 6:1.

Another method for recovering purified sulfonamido image-forming compound is recovery method II, said method comprising the steps of:
a. preparing a third solution by adding a water-immiscible low-boiling solvent of intermediate polarity to said first solution;
b. removing said aprotic solvent from said third solution by at least once:
  i. mixing said third solution with water to form a mixture of said third solution and a fourth solution comprising water and at least a portion of said aprotic solvent; and
  ii. separating said third solution from said fourth solution; and
c. evporating at least a portion of said water-immiscible low-boiling solvent of intermediate polarity from said third solution to effect crystallization of said purified image-forming sulfonamido compound.

Examples of water-immiscible low-boiling solvents of intermediate polarity which can be used in the present invention include ethyl acetate, methyl propionate and the like. The preferred water-immiscible low-boiling solvent of intermediate polarity is ethyl acetate.

By "solvents of intermediate polarity" is meant that the solvent must have affinity for the dye releasing compound, must be miscible with the aprotic solvent in order to form the third solution and be immiscible with water.

The ratio of the volume of the water-immiscible low-boiling solvent of intermediate polarity to the volume of solution comprising aprotic solvent and image-forming sulfonamido compound can be from 1:1 to 10:1. Most often this ratio varies between 3:1 and 5:1.

The ratio of the volume of water to the volume of the solution comprising said water-immiscible low-boiling solvent of intermediate polarity, aprotic solvent and purified image-forming sulfonamido compound can be from 2:1 to 5:1. Most often this ratio varies between 2:1 and 3:1.

Separation of the aqueous phase of the mixture from the organic phase can be effected as previously described in Step (b)(ii) of the purification process. The aprotic solvent can be extracted by the aqueous phase, leaving a solution which substantially comprises water-immiscible low-boiling solvent of intermediate polarity and purified image-forming sulfonamido compound. The water-immiscible solvent can then be evaporated. The purified image-forming sulfonamido compound can be crystallized by chilling, recrystallization in a solvent such as glacial acetic acid, pouring the resulting oil into a nonsolvent such as an aliphatic hydrocarbon and other methods known in the art.

Other methods of recovery of the purified image-forming sulfonamido compound include pouring the separated first solution thereof into dimethyl formamide directly into acetic acid and recovering purified crystalline product therefrom. The preferred method of recovery is recovery method I.

The image-forming sulfonamido compound can be a nondiffusible sulfonamido compound which is alkali-cleavable upon oxidation to release a diffusible sulfonamido color-providing moiety. The nondiffusible sulfonamido compound can also release other photographically useful groups such as development inhibitors, development accelerators, bleach inhibitors, bleach accelerators, antifoggants, complexing agents and the like.

The term "nondiffusible" as used herein has the meaning commonly applied to the term in photography and denotes materials that, for all practical purposes, do not migrate nor wander through organic colloid layers, such as gelatin, in an alkaline medium in photographic elements, and preferably when processed in a medium having a pH of 10 or greater. The term "diffusible" has the converse meaning and denotes materials having the property of diffusing effectively through the colloid layers of the photographic elements in an alkaline medium.

In one preferred embodiment of this invention, the redox dye releasers in the Fleckenstein et al U.S. Pat. No. 4,076,529 issued Feb. 28, 1978, referred to above are employed. Such compounds are nondiffusible sulfonamido compounds which are alkali-cleavable upon oxidation to release a diffusible sulfonamido dye. In certain preferred embodiments, the compounds have the formula:

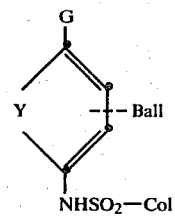

wherein:

Ball represents an organic ballasting group (preferably containing at least 8 carbon atoms) which renders said compound nondiffusible in a photographic element during processing of said element with an alkaline composition;

Y represents the atoms necessary to complete a benzene, naphthalene or heterocyclic nucleus, such as pyrazolone, pyrimidine and the like;

G is OR or $NHR_1$ wherein R is hydrogen or a hydrolyzable moiety and $R_1$ is hydrogen or a substituted or unsubstituted alkyl group of 1 to 22 carbon atoms, such as methyl, ethyl hydroxyethyl, propyl, butyl, secondary butyl, tert-butyl, cyclopropyl, 4-chlorobutyl, cyclobutyl, 4-nitroamyl, hexyl cyclohexyl, octyl, decyl, octadecyl, docosyl, benzyl, phenethyl and the like (when $R_1$ is an alkyl group of greater than 6 carbon atoms, it can serve as a partial or sole Ballast group); and Col is a dye or dye precursor moiety.

For further details concerning the above-described sulfonamido compounds, reference is made to the above-mentioned Fleckenstein et al U.S. Pat. No. 4,076,529, Belgian Pat. No. 799,268 and *Research Disclosure* No. 15157, November 1976, pages 68 to 74, the disclosures of which are hereby incorporated by reference.

Sulfonamido compounds which can be employed in this invention include the following:

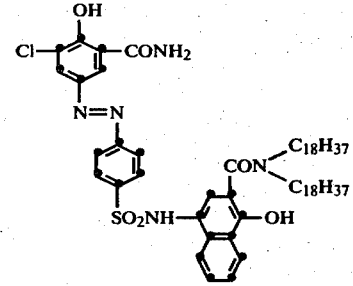

Compound No. 1

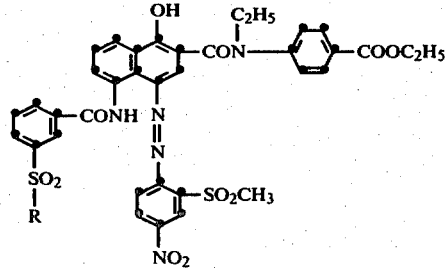

Compound No. 2

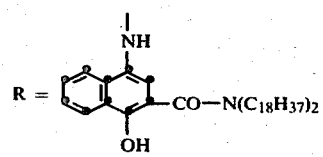

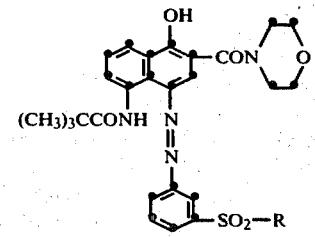

Compound No. 3

Compound No. 4

-continued

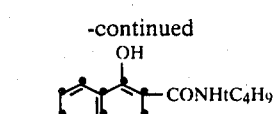

Compound No. 5

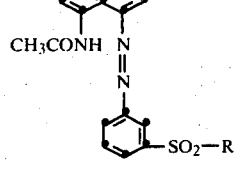

(F)

Compound No. 6

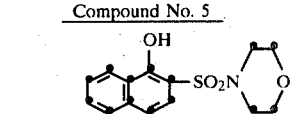

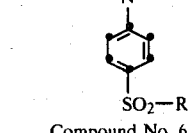

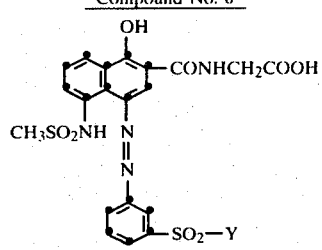

Compound No. 7

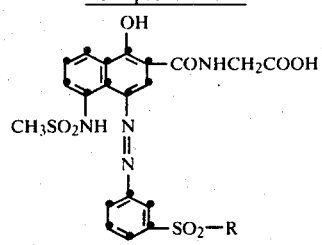

Compound No. 8

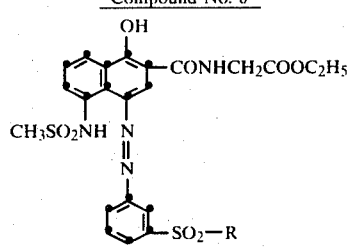

The following preparation and examples further illustrate the invention:

PREPARATION 1

3-chloro-2-hydroxy-5-{4-[4-hydroxy-3-(N,N-dioctadecylcarbamoyl)-1-naphthylsulphamoyl]-phenylazo}benzamide

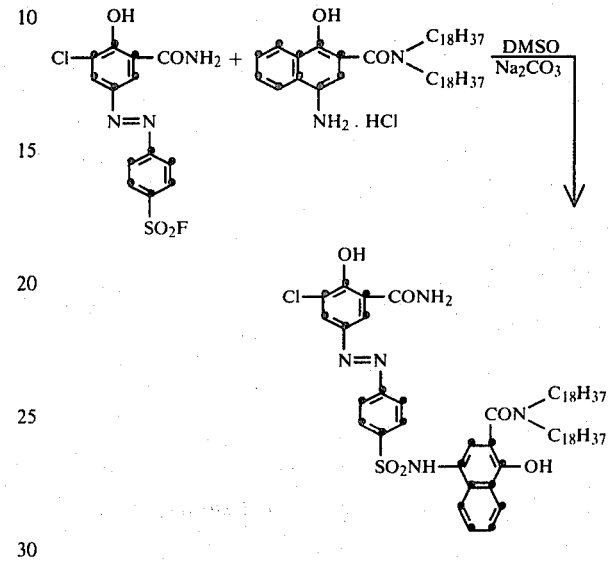

A suspension of anhydrous sodium carbonate (21.2 g, 0.02 mole) in dry dimethyl sulfoxide (1000 ml) was deoxygenated by passing nitrogen gas through for 2 hours at 100° C. (internal temperature). 4-Amino-1-hydroxy-N,N-dioctadecyl-2-naphthamide hydrochloride (37.10 g, 0.05 mole) was added to the stirred suspension under nitrogen. After 5 minutes, 4-(3-carbamoyl-5-chloro-4-hydroxyphenylazo) benzenesulfonyl fluoride (17.90 g, 0.05 mole) was added and the reactants heated at 100° C. (internal temperature) under nitrogen for 3.5 hours.

The reactants were poured into 3 N hydrochloric acid (20 l) to give a yellow ochre precipitate which was filtered and washed with water.

EXAMPLE 1

The crude 3-chloro-2-hydroxy-5-{4-[4-hydroxy-3-(N,N-dioctadecylcarbamoyl)-1-naphthylsulfamoyl]-phenylazo}-benzamide of Preparation 1 (50 g) was dissolved in dimethylformamide (500 ml) and the solution was extracted with ligroin having a boiling range of 60°-80° C. (2×500 ml). Ethyl acetate (900 ml) was added to the dimethylformamide solution and the mixture was extracted with water (3 l). The separated ethyl acetate was evaporated to dryness under reduced pressure and the resulting oil was crystallized from methanol/ethylmethylketone. The yield was 40 g.

EXAMPLE 2

A compound of the following formula was prepared by a method similar to that described in Preparation 1 except that the reactants were heated at 115° C. for 3 hours. The product, which is an ethyl ester, was purified by the same procedure as described in Example 1.

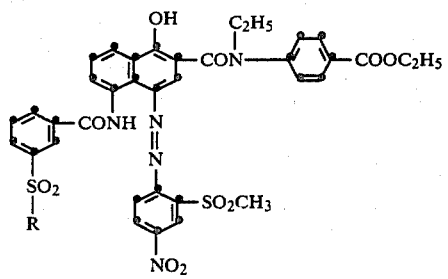
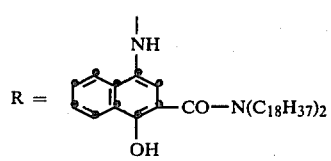
EXAMPLES 3-8
Compounds of the following formulae 3 to 8 were prepared by a method similar to that described in Preparation 1 except that the reactants were heated at 115° C. for 15 hours. The products were purified by the same procedure as in Example 1.
Example 3
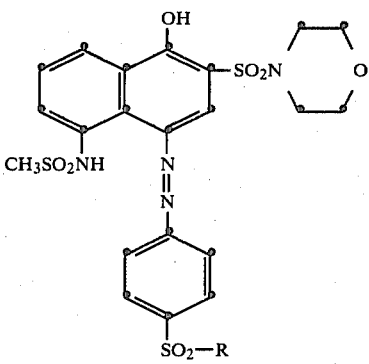
Example 6
Example 4
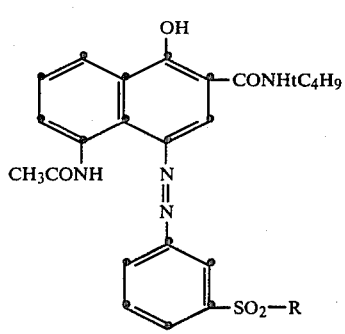
Example 7
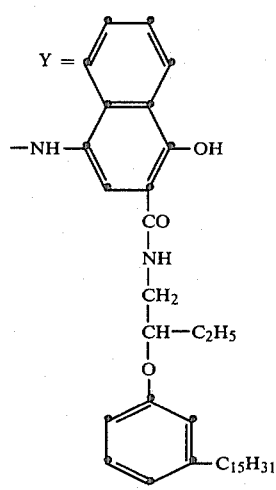
Example 5
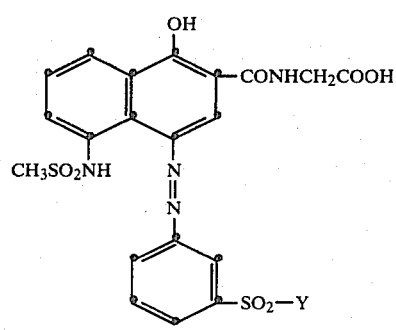
Example 8
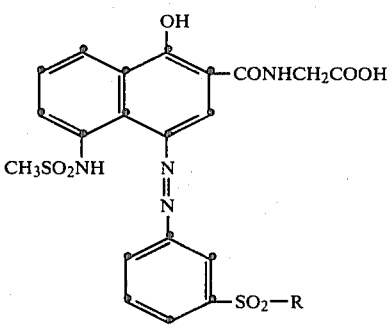

-continued

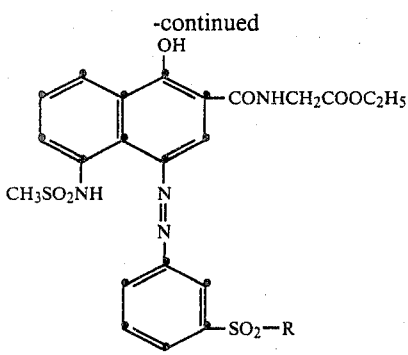

EXAMPLE 9

To a stainless steel vessel containing 82 liters of dimethyl formamide and 50 liters of a petroleum having a boiling range of 71°–96° C. (SBP2 by Shell Corp.) was added 11,000 grams of a compound having the formula:

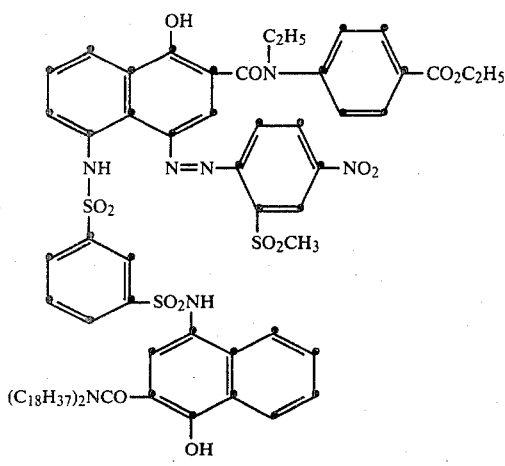

under nitrogen. A filter aid containing crystalline silica (750 grams) was added and the mixture was stirred for 15 minutes. The contents of the vessel were then filtered through a filter (a plate pressure filter) to remove solid impurities into a glass-lined vessel under vacuum. The filtrate was allowed to settle for 15 minutes under nitrogen. The bottom, product layer was run off into a stainless steel can. A further 50 liters of the petroleum was then added to the glass-lined vessel and then the product layer was returned from the stainless steel can to the glass-lined vessel under vacuum. The mixture was then stirred for 15 minutes and settled for 15 minutes under nitrogen. The bottom, product layer from this second treatment with petroleum was then drawn off into the stainless steel can and then transferred by vacuum to a stainless steel vessel containing 335 liters of glacial acetic acid diluted with 95 liters of water. The pure compound was then allowed to crystallize under nitrogen and the crystals were separated in a nitrogen blanketed centrifuge. The compound was then washed with dilute acetic acid (40 liters glacial:200 liters water) and dried.

The invention has been described in detail with particular reference to certain preferred embodiments thereof, but it will be understood that variations and modifications can be effected within the spirit and scope of the invention.

What is claimed is:

1. A process for purifying a photographic image-forming sulfonamido compound, said process comprising the steps of:
    a. preparing a first solution by dissolving an unpurified image-forming sulfonamido compound in an aprotic solvent;
    b. removing impurities from said first solution by, at least once:
        i. mixing said first solution with an immiscible nonpolar, low-boiling organic solvent to form a mixture of said first solution and a second solution comprising said immiscible nonpolar, low-boiling organic solvent and at least a portion of said impurities; and
        ii. separating said first solution from said second solution; and
    c. recovering purified image-forming sulfonamido compound from said first solution.

2. The process of claim 1 wherein recovery of said purified image-forming sulfonamido compound is effected by:
    a. evaporating said first solution to remove nonpolar, low-boiling solvent contamination; and
    b. precipitating said image-forming sulfonamido compound in a nonsolvent.

3. The process of claim 1 wherein recovery of said purified image-forming sulfonamido compound is effected by:
    a. preparing a third solution by adding to (b)(i) a water-immiscible low-boiling solvent of intermediate polarity to said first solution;
    b. removing said aprotic solvent from said third solution by at least once:
        i. mixing said third solution with water to form a mixture of said third solution and a fourth solution comprising water and at least a portion of said aprotic solvent; and
        ii. separating said third solution from said fourth solution; and
    c. evaporating at least a portion of said water-immiscible low-boiling solvent of intermediate polarity from said third solution to effect crystallization of said purified image-forming sulfonamido compound.

4. The process of claim 1 wherein said aprotic organic solvent is N,N,-dimethylformamide and said immiscible nonpolar, low-boiling solvent is a petroleum hydrocarbon having a boiling range of 60°–80° C.

5. The process of claim 4 wherein said petroleum hydrocarbon is ligroin having a boiling range of 60°–80° C.

6. The process of claim 2 wherein said nonsolvent comprises water, an aqueous dilute acid solution, or an alcoholic dilute acid solution.

7. The process of claim 6 wherein said alcoholic dilute acid solution comprises methanol or isopropyl alcohol.

8. The process of claim 6 wherein said aqueous dilute acid solution comprises hydrochloric acid or acetic acid.

9. The process of claim 3 wherein said water-immiscible, low-boiling solvent of intermediate polarity is ethyl acetate.

10. The process of claim 1 wherein said image-forming sulfonamido compound is a nondiffusible sulfonamido compound which is alkali-cleavable upon oxidation to release a diffusible sulfonamido color-providing moiety, said sulfonamido compound having the formula:

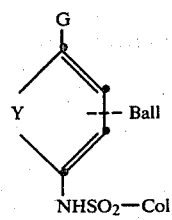

wherein:
Col is a dye or dye precursor moiety;
Ball is an organic ballasting group which renders said compound nondiffusible in a photographic element during development in an alkaline processing composition;
Y represents the atoms necessary to complete a benzene, naphthalene or heterocyclic nucleus; and
G is OR or $NHR_1$ wherein R is hydrogen or a hydrolyzable moiety and $R_1$ is hydrogen or an alkyl group of 1 to 22 carbon atoms.

11. The process of claim 10 wherein said sulfonamido compound is a sulfonamidonaphthol.

12. The process of claim 10 wherein recovery of said nondiffusible sulfonamido compound is effected by:
 a. evaporating said first solution to remove nonpolar, low-boiling solvent contamination; and
 b. precipitating said image-forming sulfonamido compound in a nonsolvent.

13. The process of claim 10 wherein recovery of said nondiffusible sulfonamido compound is effected by:
 a. preparing a third solution by adding a water-immiscible low-boiling solvent of intermediate polarity to said first solution;
 b. removing said aprotic solvent from said third solution by at least once:
  i. mixing said third solution with water to form a mixture of said third solution and a fourth solution comprising water and at least a portion of said aprotic solvent; and
  ii. separating said third solution from said fourth solution; and
 c. evaporating at least a portion of said water-immiscible low-boiling solvent of intermediate polarity from said third solution to effect crystallization of said purified image-forming sulfonamido compound.

14. The process of claim 10 wherein said aprotic organic solvent is N,N-dimethylformamide and said immiscible nonpolar, low-boiling solvent is a petroleum hydrocarbon.

15. A process for purifying a photographic image-forming sulfonamido compound, said process comprising the steps of:
 a. preparing a first solution by dissolving an unpurified image-forming sulfonamido compound in N,N-dimethylformamide;
 b. removing impurities from said first solution by at least once:
  i. mixing said first solution with ligroin having a boiling range of 60°–80° C. to form a mixture of said first solution and a second solution comprising said ligroin and at least a portion of said impurities;
  ii. separating said first solution from said second solution; and
 c. recovering purified imageforming sulfonamido compound from said first solution by:
  i. evaporating said first solution to remove ligroin contamination; and
  ii. precipitating said image-forming sulfonamido compound in a nonsolvent.

16. The process of claim 15 wherein said non-solvent is a dilute solution of hydrochloric acid in methanol or a dilute solution or acetic acid in isopropyl alcohol.

17. The process of claim 15 wherein said image-forming sulfonamido compound is a nondiffusible sulfonamido compound which is alkali-cleavable upon oxidation to release a diffusible sulfonamido color-providing moiety, said sulfonamido compound having the formula:

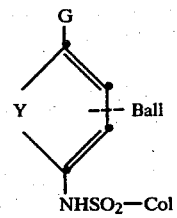

wherein:
Col is a dye or dye precursor moiety;
Ball is an organic ballasting group which renders said compound nondiffusible in a photographic element during development in an alkaline processing composition;
Y represents the atoms necessary to complete a benzene, naphthalene or heterocyclic nucleus; and
G is OR or $NHR_1$ wherein R is hydrogen or a hydrolyzable moiety and $R_1$ is hydrogen or an alkyl group of 1 to 22 carbon atoms.

18. The process of claim 15 wherein said sulfonamido compound is sulfonamidonaphthol.

* * * * *